ABSTRACT

United States Patent [19]
Dietz et al.

[11] 3,890,249
[45] June 17, 1975

[54] SILICA PREPARATION

[75] Inventors: Richard E. Dietz, Bartlesville; Joseph A. Delap, Dewey, both of Okla.

[73] Assignee: Phillips Petroleum Company, Bartlesville, Okla.

[22] Filed: Nov. 29, 1972

[21] Appl. No.: 310,450

[52] U.S. Cl. ............................. 252/458; 252/451
[51] Int. Cl. ..................... B01j 11/06; B01j 11/36
[58] Field of Search .................. 252/451, 458, 452; 423/338, 339

[56] References Cited
UNITED STATES PATENTS

| | | |
|---|---|---|
| 1,413,457 | 4/1922 | Collins ............................. 252/451 |
| 2,978,298 | 4/1961 | Wetzel et al. ..................... 252/451 X |
| 3,622,521 | 11/1971 | Hogan et al. ..................... 252/458 X |
| 3,652,214 | 3/1972 | Aboutboul et al. ............. 252/451 X |
| 3,652,215 | 3/1972 | Aboutboul et al. ............. 252/451 X |

*Primary Examiner*—Carl F. Dees

[57] ABSTRACT

A method of producing a xerogel which involves passing a solvent in which water is soluble through a hydrogel under conditions to remove water from the hydrogel and to form a xerogel.

9 Claims, 1 Drawing Figure

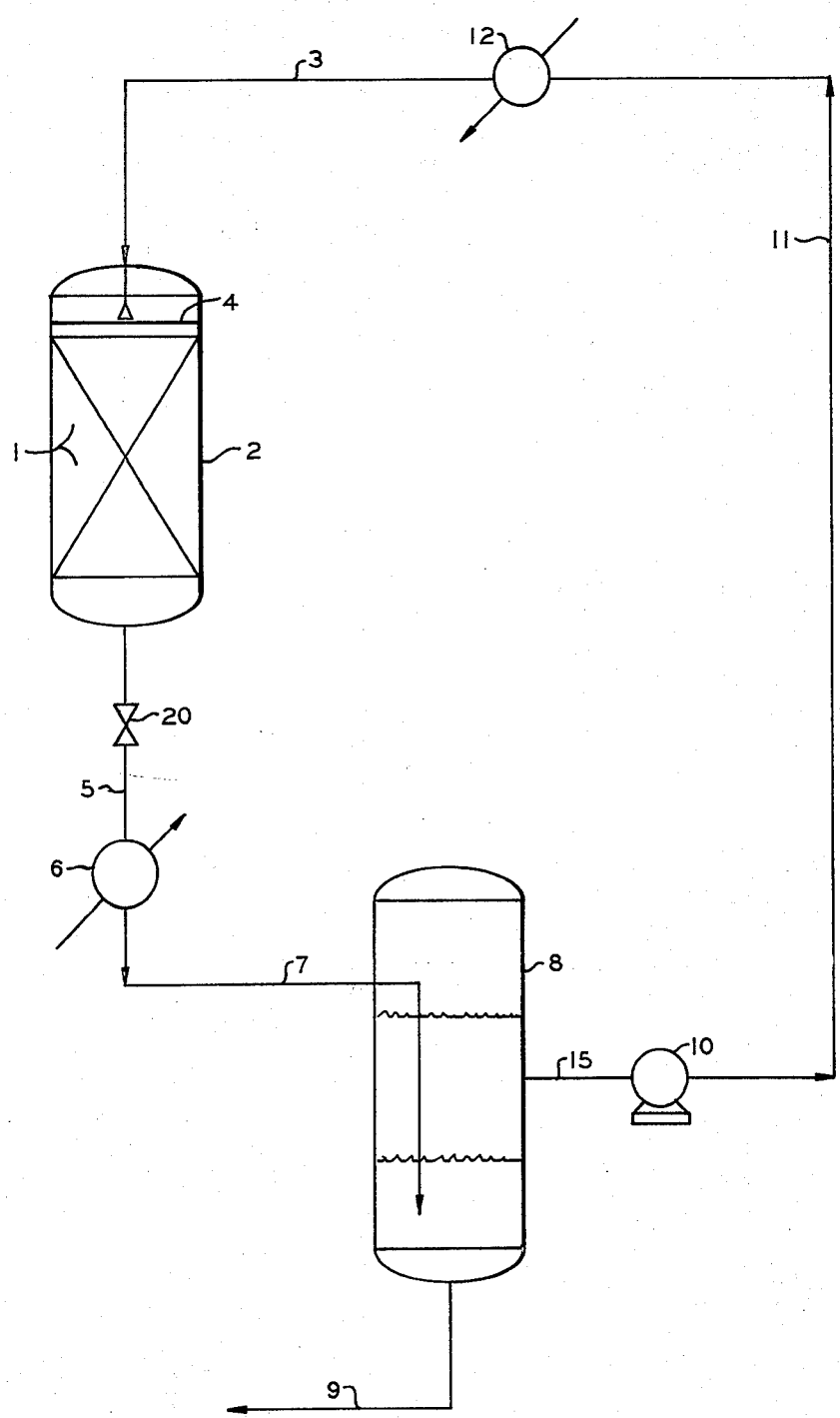

SILICA PREPARATION

This invention relates to silica preparation.

In one of its more specific aspects, this case relates to the dehydration of the silica hydrogel to form a xerogel.

The production of silica gels and their dehydration to form xerogels which can be used for catalyst supports in processes such as that disclosed in U.S. Pat. No. 2,825,721 is well known. Such procedures usually involve the production of the hydrogel employing an alkali metal silicate solution and a mineral acid solution, the aging of the hydrogel and the substantial dehydration of the hydrogel to form the xerogel.

One method of converting the hydrogel to the xerogel involves the azeotropic distillation of a mixture comprising the hydrogel with a compound, preferably an oxygen-containing, normally liquid compound capable of forming an azeotropic mixture with the water of the hydrogel. The water taken overhead is separated from the compound and the compound can be reintroduced into contact with the heated mixture.

One disadvantage with this prior art procedure is that the heating of the mixture to remove the water and compound tends to produce a silica of smaller-than-desired particle size. The method of this invention is directed towards the solution of that problem.

According to this invention there is provided a method for the dehydration of a hydrogel which comprises contacting a hydrogel with a liquid in which water is soluble, the contact being made with the solvent at a first temperature at which the solvent is in the liquid phase to remove water from the hydrogel and to form a solution comprising water and the solvent. The solution is then cooled to a second temperature at which the water is less soluble in the solvent and at which temperature the solution separates into two phases, one comprised principally of water and the other comprised principally of the solvent.

The solvent, which contains only a minor amount of water, can then be heated and recirculated into contact with the hydrogel. The hydrogel can be established as a static bed, the process being continued until substantially all of the water has been removed from the hydrogel and a xerogel is formed.

The method of this invention is applicable to the conversion of any hydrogel to a xerogel, regardless of the nature of the hydrogel or to its method of preparation. It is also applicable to the employment of any solvent in which water is partly soluble, the solubility of the water in the solvent increasing with an increase in temperature. Such materials, referred to as solvents, include aliphatic esters such as ethyl acetate, isopropyl acetate, etc., aliphatic ketones such as methyl propyl ketone, ethyl n-propyl ketone, etc., aliphatic alcohols such as butanol-1, 2-methyl-propanol-1, pentanol-2, pentanol-3, 2-methyl-butanol-3, isobutanol, etc., and the like. Ethyl acetate is preferred.

The method of this invention in one embodiment involves the establishment of the silica hydrogel as a mass within a vessel. The hot solvent, maintained in liquid phase at a temperature preferably above its atmospheric boiling point by imposing a suitable pressure, i.e., superatmospheric pressure on the vessel, is passed through the bed to form a solvent-water mixture. The mixture is cooled and is passed into a separator in which it separates into two phases, a solvent-rich phase and a water-rich phase. If desired, the pressure can be reduced before or after cooling has occurred. The solvent-rich phase which contains residual water can then be passed through a heater to raise its temperature, again preferably above the atmospheric boiling point, and reintroduced into the hydrogel bed under liquid phase conditions. This procedure is continued until practical amounts of water are no longer being removd from the silica gel.

At this point, in one embodiment, the solvent-rich phase is heated above its vaporization point after being separated from the water-rich phase and is introduced into contact with the silica gel as a vapor to remove additional quantities of water. Dry, inert gas-sweeping can also be employed.

By means of this invention a silica xerogel is produced which, when employed as a support for the catalyst employed in that process set forth in the aforementioned patent, enables the production of high melt index polymer.

The method of this invention is further illustrated by reference to the attached drawing which depicts a simplified embodiment of the invention.

Referring to the attached drawing, hydrogel bed 1 is positioned in vessel 2. The hot solvent at an elevated temperature is introduced into the vessel through conduit 3, being discharged therefrom, preferably onto baffle plate 4, in a manner to minimize attrition at the top of the bed. Suitable pressure is maintained in the vessel to insure that liquid phase conditions are maintained.

The solvent mixture formed passes through the bed and from the vessel the mixture can be passed through pressure control means 20 and thence through conduit 5 into cooler 6. Pressure control means 20 can be eliminated and the system can be operated under substantially constant pressure.

In the cooler, the solvent mixture is cooled to a temperature such that the two phases are formed. The two-phase mixture then passes through conduit 7 into separator 8.

In the separator, the two-phase mixture is separated into two layers. The water-rich phase can be withdrawn to disposal through conduit 9.

The solvent-rich layer is withdrawn from the separator through conduit 15 to pump 10 and is discharged from the pump through conduit 11 and into heater 12 where it is heated to the desired temperature and introduced into the vessel through conduit 3.

As may be required, one or more coolers, including a propane chiller, can be employed for cooler 6. Similarly, one or more heaters, including a vaporizer, can be employed for heater 12.

The systsem can be conducted under any suitable pressure depending upon the state in which it is desired to maintain the water-solvent mixture. During the employment of the solvent in the liquid phase, the system can be maintained at a first pressure. During the subsequent employment of the solvent in the gaseous phase, the system can be maintained at a second pressure lower than the first.

The process can be conducted with the solvent at any suitable temperature upon its introduction into contact with the hydrogel. Preferably, the solvent will be employed at elevated temperatures and pressures to effect maximum solubility of the water in the solvent while maintaining the solvent in the liquid state.

The solvent is passed into contact with the hydrogel at any suitable rate. Inasmuch as the invention involves the solution of a liquid in a liquid, prolonged contact times are not required.

The following illustrates one embodiment for carrying out the invention in which ethyl acetate was employed as the solvent.

A silica-containing hydrogel was produced by introducing a sodium silicate solution into a sulfuric acid solution and aging the hydrogel which formed for at least one hour. This procedure was in accordance with prior art procedures. The hydrogel was impregnated with a solution of chromium acetate sufficient to give about 2 weight percent chromium expressed as chromium oxide based on the dry catalyst. Additionally, the gel could have been impregnated with a titanium compound at any time prior to activation of the composite.

About 36 pounds of hydrogel containing about 31 pounds of water were positioned in the form of a bed having an area of 0.5 square feet and a height of about 20 inches.

Ethyl acetate, in the liquid phase at about 85 psig and 255°F, was introduced into contact with the hydrogel at a rate of 11.8 gallons per hour for a period of about 5½ hours. The solution leaving the hydrogel was reduced to atmospheric pressure and was passed through a cooler and into a phase separator maintained at 60°F. Separation of the ethyl acetate-rich phase and the water-rich phase was effected by gravity and the separated ethyl acetate-rich phase, containing about 3 percent water, was recycled through the heater to raise its temperature to 255°F and into contact with the hydrogel at a pressure at about 85 psig.

Circulation in this manner was continued until substantially no separation of water from the ethyl acetate-rich phase occurred in the phase separator. Circulation of the ethyl acetate-rich phase was then discontinued. Dry nitrogen was then introduced into the gel under atmospheric pressure at a temperature of about 280°F to remove residual ethyl acetate and dissolved water from the gel to form the xerogel.

The xerogel-chromium composition was activated under prior art procedures to produce a catalyst active for ethylene polymerization. The polymerization produced a polymer having a melt index of 5.4.

Summarily, the extraction system had employed about 97 pounds of ethyl acetate per pound of $SiO_2$, one pound of water requiring about 15.7 lbs. of ethyl acetate.

Other data, obtained under similar conditions, indicate that isobutanol can be employed at a rate of about 23 pounds per pound of water and methyl propyl ketone can be employed at a rate between about 16 and about 34 pounds per pound of water.

It is to be understood that the method of this invention is applicable to produce any xerogel, regardless of the nature or composition of the hydrogel. For example, the hydrogel can be produced in any manner with any catalytic component, such as chromium, or an adjuvant, such as titanium, being introduced into it at any stage of its processing.

It is further to be understood that while the method of this invention has been described in terms of employing gravity separation of the water-rich phase and solvent-rich phase, other separation systems can be employed for this purpose.

It will be evident from the above that various modifications can be made to the method of this invention. However, such are considered as being within the scope of the invention.

What is claimed is:

1. A method of preparing a silica-containing xerogel which comprises:
   a. contacting a silica-containing hydrogel with an organic solvent in which water is soluble said solvent at a first temperataure elevated above the atmospheric boiling point of said organic solvent said solvent being maintained in the liquid phase by superatmosheric pressure, to remove water from said hydrogel and to form a xerogel and to form a solvent-water solution;
   b. separating said solvent-water solution from said xerogel;
   c. cooling said solvent-water solution to a second temperature less than said first temperature to form a water-rich phase and a solvent-rich phase; and
   d. recovering the silica-containing xerogel.

2. The method of claim 1 in which said solvent-rich phase is separated from said water-rich phase and said solvent-rich phase is heated and introduced into contact with said hydrogel as defined in step (a).

3. The method of claim 1 in which said solvent is introduced into contact with said hydrogel at a first pressure and the solvent-water solution is cooled at a second pressure less than said first pressure.

4. The method of claim 2 in which said organic solvent is selected from the group consisting of aliphatic esters, aliphatic ketones and aliphatic alcohols.

5. The method of claim 1 in which said solvent is introduced into contact with said hydrogel and is cooled at a substantially constant pressure.

6. The method of claim 2 in which said solvent-rich phase comprises ethyl acetate.

7. The method of claim 2 in which said xerogel is contacted with said solvent in the vapor state prior to recovery.

8. The method of claim 2 in which said hydrogel comprises silica, a chromium compound and, optionally, a titanium compound.

9. The method of claim 7 in which said xerogel is contacted with nitrogen after being contacted with said solvent in the vapor state.

* * * * *